US010932321B1

(12) United States Patent
Mehta et al.

(10) Patent No.: US 10,932,321 B1
(45) Date of Patent: *Feb. 23, 2021

(54) METHOD OF PROVIDING DATA, VOICE, AND SMS SERVICES TO LTE SUBSCRIBERS ROAMING IN 2G/3G VISITED NETWORKS

(71) Applicant: Syniverse Technologies, LLC, Tampa, FL (US)

(72) Inventors: Rakesh K. Mehta, Tampa, FL (US); Paul Peregolise, Lithia, FL (US); Prashant Datar, Tampa, FL (US)

(73) Assignee: Syniverse Technologies, LLC, Tampa, FL (US)

(*) Notice: Subject to any disclaimer, the term of this patent is extended or adjusted under 35 U.S.C. 154(b) by 228 days.

This patent is subject to a terminal disclaimer.

(21) Appl. No.: 15/993,161

(22) Filed: May 30, 2018

Related U.S. Application Data

(63) Continuation of application No. 15/695,620, filed on Sep. 5, 2017, now Pat. No. 10,021,738.

(51) Int. Cl.
| | | |
|---|---|---|
| *H04W 4/00* | (2018.01) | |
| *H04W 92/02* | (2009.01) | |
| *H04W 80/10* | (2009.01) | |
| *H04L 29/08* | (2006.01) | |
| *H04W 88/16* | (2009.01) | |
| *H04W 4/14* | (2009.01) | |
| *H04W 80/04* | (2009.01) | |

(52) U.S. Cl.
CPC ............ *H04W 92/02* (2013.01); *H04L 67/28* (2013.01); *H04W 80/10* (2013.01); *H04W 88/16* (2013.01); *H04W 4/14* (2013.01); *H04W 80/04* (2013.01)

(58) Field of Classification Search
CPC ..... H04W 92/02; H04W 80/10; H04W 88/16; H04W 80/04; H04W 4/14; H04L 67/28
USPC ...................................... 455/432.1
See application file for complete search history.

(56) References Cited

U.S. PATENT DOCUMENTS

| | | |
|---|---|---|
| 8,625,617 B2 | 1/2014 | Shi |
| 8,626,157 B2 | 1/2014 | Nas et al. |
| 8,682,322 B2 | 3/2014 | Wallis et al. |
| 9,021,014 B2 | 4/2015 | Agarwal et al. |
| 9,100,796 B2 | 8/2015 | Marsico |
| 9,749,904 B1 | 8/2017 | Zhang et al. |
| 10,021,738 B1 * | 7/2018 | Mehta ................ H04L 65/1016 |
| 2015/0078288 A1 | 3/2015 | Sanyal et al. |
| 2015/0098394 A1 | 4/2015 | Corcoran et al. |

FOREIGN PATENT DOCUMENTS

EP        2658333 B1    10/2015

* cited by examiner

*Primary Examiner* — Amancio Gonzalez
(74) *Attorney, Agent, or Firm* — Andriy Lytvyn; Smith & Hopen, P.A.

(57) ABSTRACT

A method of providing voice call, data, and SMS services to a user equipment roaming in a 2G/3G visited network and subscribed to an LTE home network. An Interworking Function communicates with both the visited network and the home network. The Interworking Function translates between Mobile Application Part (MAP) protocol used by the 2G/3G visited network and Session Initiation Protocol (SIP) used by the LTE home network. The Interworking Function establishes both a MAP Registration with the 2G/3G visited network and also a SIP Registration with the LTE home network, thereby enabling provision of voice call, data, and SMS services to the roaming UE.

20 Claims, 11 Drawing Sheets

METHOD OF PROVIDING DATA, VOICE, AND SMS SERVICES TO LTE SUBSCRIBERS ROAMING IN 2G/3G VISITED NETWORKS

PRIORITY CLAIM

This application is a continuation of and claims priority to U.S. Nonprovisional patent application Ser. No. 15/695,620 filed Sep. 5, 2017, entitled "METHOD OF PROVIDING DATA, VOICE, AND SMS SERVICES TO LTE SUBSCRIBERS ROAMING IN 2G/3G VISITED NETWORKS."

BACKGROUND OF THE INVENTION

1. Field of the Invention

This invention relates to mobile communications. More specifically, the invention pertains to a method of providing voice call, data, and SMS roaming services to VoLTE/LTE subscribers visiting 2G/3G networks.

2. Brief Description of the Related Art

International travel has become ubiquitous and those engaging in such travel create a strong demand for data roaming services when outside of their home mobile network coverage area. In the United States and the European Union, a large percentage of mobile networks are Long Term Evolution (LTE) networks. In many other markets, however, data, voice, and short message services (SMS) are provided predominantly or exclusively via 2G/3G networks. Because many LTE home networks lack core 2G/3G network components, these LTE networks are unable to provide out-bound roaming services to their subscribers when they are roaming within 2G/3G serve networks. Currently, to provide coverage for an LTE subscriber in 2G/3G market, the LTE home network operators would have to expend substantial resources to acquire and integrate 2G/3G core network components into their network.

Although LTE coverage is rapidly expanding, the roaming traffic is not expanding at the same pace and in many geographic locations only 2G/3G mobile networks are available while roaming. Lack of ubiquitous LTE coverage presents a challenge for LTE-only mobile network operators—commonly referred to as Greenfield operators—which do not have 2G/3G network components and do not have circuit switch fall back capabilities, because they are unable to provide seamless roaming experience to their subscribers. To have a capability to provide coverage in a 2G/3G market, Greenfield operators would have to expend significant resources to deploy 2G/3G core network elements within their networks.

Lack of 2G/3G network components presents a two-fold problem for LTE network operators: on one hand, the LTE network operators are unable to provide in-bound voice and SMS roaming services to 2G/3G subscribers; on the other hand, the LTE network operators are also unable to provide out-bound roaming services to their own subscribers who are visiting 2G/3G networks. U.S. patent application Ser. No. 14/230,633, which is currently assigned to SYNIVERSE® and will soon issue into a patent, discloses and claims a method that addresses the first problem listed above by enabling the LTE networks to provide in-bound roaming to 2G/3G subscribers. However, until the present invention, an efficient and effective solution to the problem of enabling the LTE network to provide out-bound roaming services to a subscriber visiting a 2G/3G network was not known in the art.

SUMMARY OF THE INVENTION

The present invention enables an LTE-only (Greenfield) mobile network operator or a Greenfield operator to provide out-bound roaming services to their subscribers in 2G/3G markets without deploying 2G/3G core network elements at their home networks. The present invention is a method of providing voice call, short message service (SMS), and data roaming services to a User Equipment (UE) subscribed to an LTE home public mobile network (HPMN) while the UE is roaming in a 2G/3G visited public mobile network (VPMN). The invention involves an Interworking Function (IWF) having a Proxy Call Session Control Function (P-CSCF), a Home Location Register (HLR) and a Short Message Service Center (SMSC) components. The IWF is in communication with both the HPMN and the VPMN.

When the VPMN receives a request from the UE to access voice call, SMS, and/or data roaming services in the VPMN, the VPMN initiates an authentication procedure. To authenticate the UE in the VPMN, the IWF converts between a Mobile Application Part (MAP) protocol of the VPMN and a Diameter protocol of the HPMN.

After the UE is authenticated into the VPMN, the IWF receives a MAP Location Update (LU) Message from the VPMN. The IWF converts the MAP LU Message into a Diameter S6d interface Update Location Request (ULR) Message and sends the ULR Message to a Home Subscriber Server (HSS) of the HPMN. The HSS returns a S6d Profile for the UE, wherein the S6d profile is a Packet Switched (PS) Profile. Instead of sending the PS Profile returned by the HSS, the IWF sends to the VPMN a pre-defined Circuit Switch (CS) Profile. Responsive to the VPMN accepting the CS Profile, the IWF establishes a CS Registration with the VPMN.

The IWF also initiates a SIP Registration in the HPMN by sending a SIP Register message to the HSS. Responsive to receiving a SIP Response from the HPMN, the IWF establishes a SIP Registration with the HPMN. Because the IWF concurrently maintains the CS Registration with the VPMN and the SIP Registration with the HPMN, the IWF enables provision of the voice call, SMS, and data roaming services to the UE subscribed to the HPMN while the UE is roaming in the VPMN, wherein HPMN is an LTE mobile network and the VPMN is a 2G/3G mobile network.

In an embodiment, to authenticate the UE in the VPMN, the IWF converts a MAP Send Authentication Information (SAI) Message originating from the VPMN to a Diameter S6d interface Authentication Information Request (AIR) Message and transmits the AIR Message to the HSS of the HPMN. The IWF converts an Authentication Information Answer (AIA) Message received from the HSS to a MAP SAI Response Message and sends the MAP SAI Response Message to the VPMN.

In an embodiment, the IWF is hosted on the IP Packet eXchange (IPX) network.

In an embodiment, to register the UE for data services in the VPMN a Serving General Packet Radio Service (GPRS) Support Node (SGSN) of the VPMN sends a GPRS Location Update message to the IWF, and the IWF returning the PS profile to the SGSN.

In an embodiment, delivery of voice calls from a Calling Party to the UE involves the following steps. A Serving Call Session Control Function (S-CSCF) of the HPMN forwards a SIP Invite message to the P-CSCF component of the IWF. The HLR component of the IWF queries a Visited Location Register (VLR) of the VPMN for a Mobile Subscriber Roaming Number (MSRN) assigned to the UE and returns the MSRN to the P-CSCF component of the IWF. The P-CSCF component of the IWF the sends the SIP Invite message to Media Gateway (MG) of the HPMN. For IMS originating calls—i.e., the Calling Party is subscribed to an IMS network—the MG provides interworking between Integrated Services Digital Network User Part (ISUP) and SIP signaling for call control.

In an embodiment, call delivery for calls originating from the UE to a Called Party that is an IMS subscriber involves the following steps. A Mobile Switching Center (MSC) of the VPMN sends an ISUP message to a MG of the HPMN. The MG then sends a SIP Invite to a S-CSCF of the HPMN. The S-CSCF routes the SIP Invite to a P-CSCF within the IMS subscriber's home network.

For calls originating from the UE to a Called Party subscribed to a Public Switched Telephone Network (PSTN), the MSC of the VPMN sends an ISUP message to a GMSC of the subscriber's home network. The GMSC requests a MSRN assigned to the Called Party from a HLR within the Called Party's network. The GSMC uses the MSRN to route the call to the Called Party.

To send an SMS message originating from the UE, a MSC of the VPMN routes the SMS message to the IWF. The IWF retrieves the UE's Mobile Station International Subscriber Directory Number (MSISDN) from the SMS message. The P-CSCF component of the IWF sends a SIP SMS Message to a S-CSCF of the HPMN. The S-CSCF then forwards the SIP SMS Message to an IP-SMSC within the HPMN. The SMS Service Center (SC) address provisioned in the UE is that of the IWF.

The following are several exemplary advantages achieved by the invention over the prior art methods. First, because 2G/3G networks are more prevalent than LTE networks, there are more potential 2G/3G roaming partners then there are LTE roaming partners. The present invention enables an LTE subscriber to have seamless service while roaming in the 2G/3G networks. Greenfield operators can use 2G/3G sponsored networks for greater coverage. The present invention eliminates gaps in coverage where LTE is not available.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
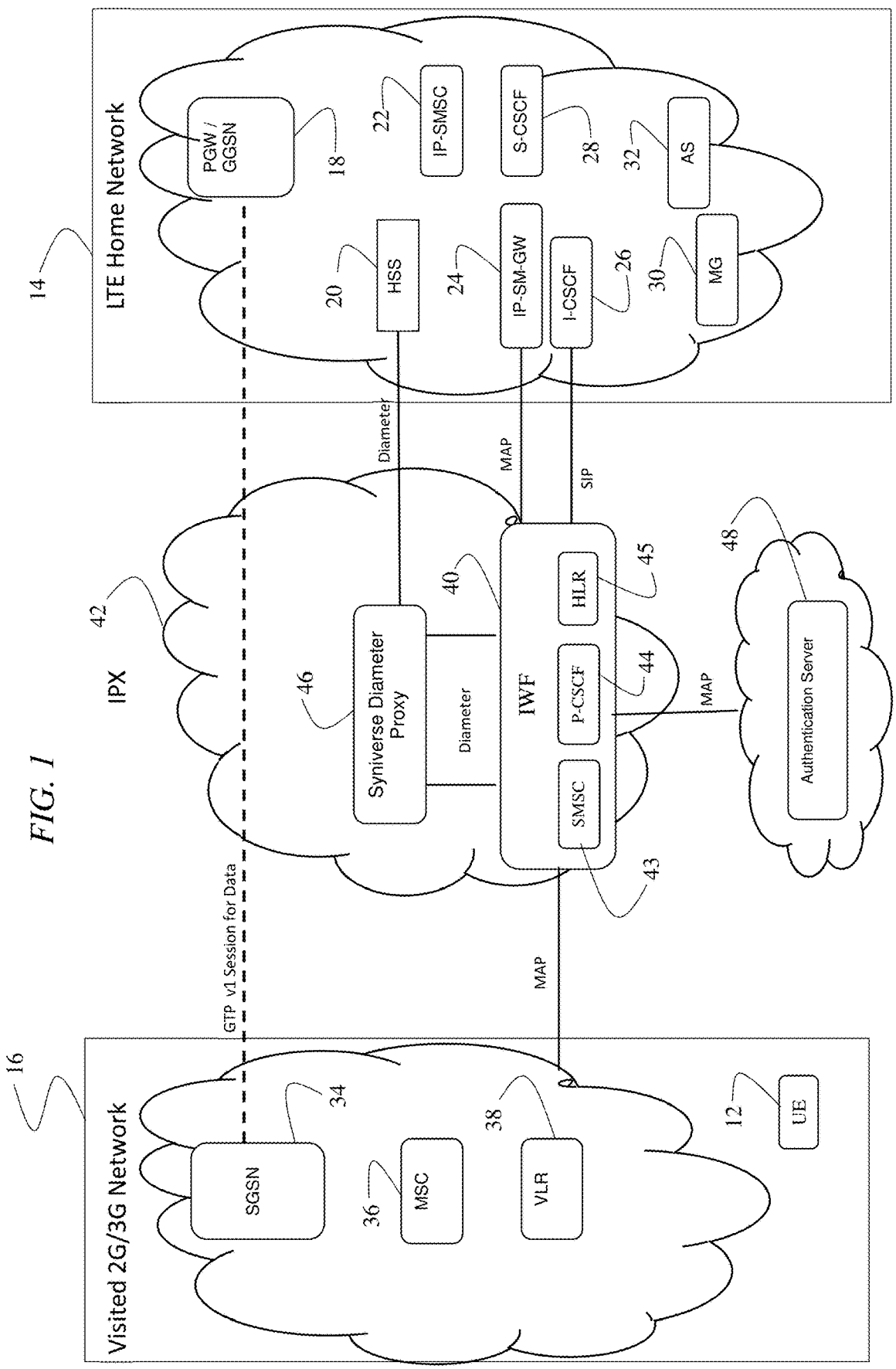
FIG. 1 is diagram schematically depicting architecture of the present invention.

The invention pertains to network communications. More specifically, the invention is a method of enabling data, voice, and SMS services to an LTE home network subscriber roaming in a 2G/3G serve network. The general architecture of the invention is depicted in FIG. 1. A user equipment (UE) 12 is subscribed to an LTE Home Mobile Network (HPMN) 14 and is roaming in a 2G/3G Visited Mobile Network (VPMN) 16. HPMN 14 includes the following network components: Packet Data Network Gateway (P-GW)/Gateway GPRS Support Node (GGSN) 18, Home Subscriber Server (HSS) 20, IP-SMCS 22, IP-SM-GW 24, Interrogating Call State Control Function (I-CSCF) 26, Serving Call State Control Function (S-CSCF) 28, (Media Gateway) MG 30, and Application Server (AS) 32. VPMN 16 includes the following network components: Serving GPRS Support Node (SGSN) 34, Mobile Switching Center (MSC) 36, and Visitor Location Register (VLR) 38.

The invention introduces an Interworking Function (IWF) 40 hosted by an Internetwork Packet Exchange (IPX) network 42. IWF 40 includes a Short Message Service Center (SMSC) 43, a Proxy Call Session Control Function (P-CSCF) 44, and Home Location Register (HLR) 45. IPX network 42 also hosts a Diameter Proxy 46. Diameter Proxy 46 communicates with IWF 40 via Diameter Protocol. Diameter Proxy also communicates with HSS 20 of HPMN 14 via Diameter Protocol.

With respect to HPMN 14, IWF 40 establishes a Mobile Application Part (MAP) connection with IP-SM-GW 24 and a SIP connection with I-CSCF 26. With respect to VPMN 16, IWF 40 establishes a MAP connection with VLR 38. IWF 40 communicates with an Authentication Server 48 using MAP signaling.

IPX network 42 also hosts Diameter Proxy 46, which communicates with HSS 20 of HPMN 14 and with IWF 40 via Diameter protocol. PGW/GGSN 18 of HPMN 14 establishes a GTP Tunnel with SGSN 34 of VPMN 16 for transmission of data.

Authentication and Service Registration

Figure 2:
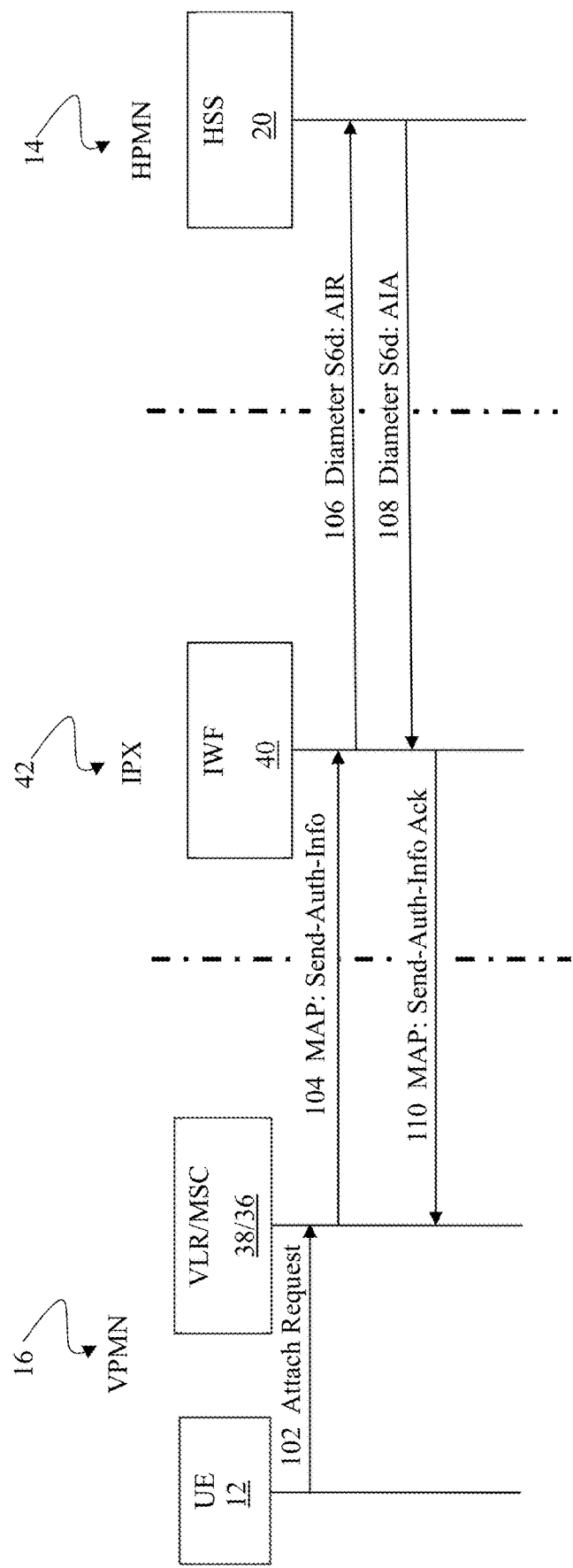
FIG. 2 is a signaling call flow of a procedure for authenticating a UE in the 2G/3G visited network.

FIG. 2 is a signaling diagram depicting the process of authenticating UE 12 onto VPMN 16. UE 12 must have a GSM radio compatible with 2G/3G services. In step 102, UE 12 sends an Attach Request to MSC 36/VLR 38. In step 104, VLR 38 sends a Send Authorization Information (SAI) message via MAP protocol to IWF 40. IWF 40 converts the MAP: SAI message to a Diameter S6d interface Authorization Information Request (AIR) message and, in step 106, sends the converted message to HSS 20 of HPMN 14 to request 2G/3G authorization vectors. In step 108, HSS 20 returns the 2G/3G authorization vectors in a Diameter S6d Authorization Information Message (AIA) Response message to IWF 40. In step 110, IWF 40 converts the AIA Response message into a MAP SAI Acknowledgement message and sends the converted message to VLR 38 of VPMN 16. At this point authentication is completed.

Figure 3:
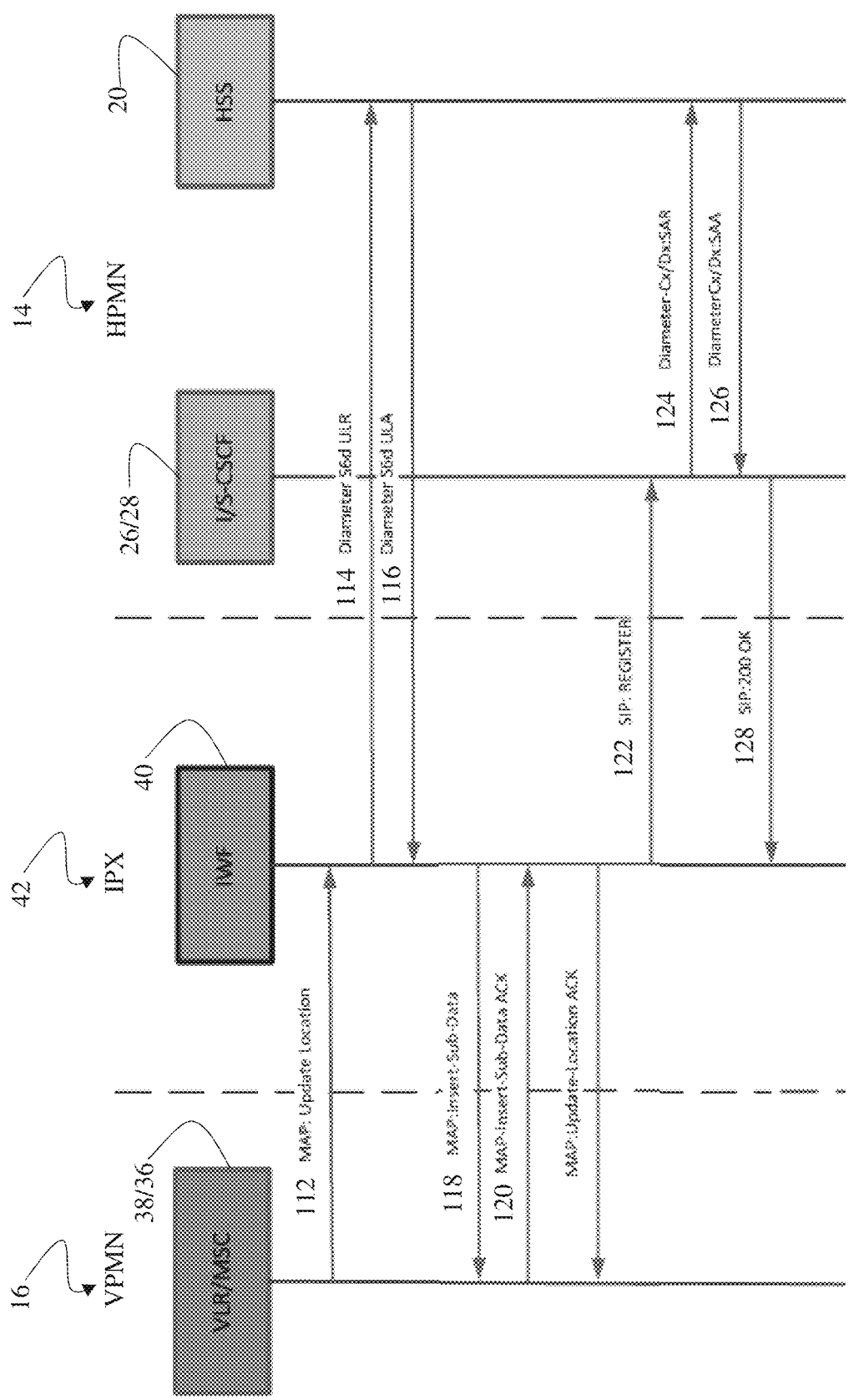
FIG. 3 is a signaling call flow of a procedure for registration of the UE in the 2G/3G visited network and LTE home network.

Once the authentication into VPMN 16 has been completed, the registration procedure commences. The registration procedure is schematically depicted in FIG. 3. In step 112, VLR 38 sends a MAP Location Update (LU) message to IWF 40 to be routed to HPMN 14. IWF 40 converts the MAP:LU message into a Diameter S6d interface Update Location Request (ULR) message and, in step 114, sends the converted message to HSS 20 of HPMN 14. In step 116, HSS 20 responds to IWF 40 with a Diameter S6d Update Location Answer (ULA) message.

IWF 40 does not forward the S6d profile for UE 12 received in the S6d ULA message to VPMN 16 because the received S6d profile is a Packet Switched (PS) profile incompatible with 2G/3G network's VLR 38. Instead, IWF 40 retrieves a pre-defined 2G/3G Circuit Switched (CS) profile and, in step 118, sends the CS profile to VLR 38 in a MAP Insert Subscriber Data (ISD) message. After the CS profile for UE 12 is accepted by VLR 38 of VPMN 16, VLR 38 returns a MAP ISD Acknowledgement message to IWF 40 in step 120.

IWF 40 also establishes a SIP Registration with HPMN 14. In step 122, P-CSCF 44 in IWF 40 initiates a VoLTE Registration to the IMS Core of HPMN 14 by sending a SIP Register message to S-CSCF 28. There is an internal interface between P-CSCF 44 and HLR 45 components of IWF 40. In step 124, S-CSCF 28 sends a Diameter Cx/Dx Server-Assignment-Request (SAR) message to HSS 20. In step 126, HSS 20 responds to S-CSCF 28 with a Diameter Cx/Dx Server Assignment Answer (SAA) message. In step 128, S-CSCF 28 sends a SIP 200 OK message to IWF 40. On completion of Registration, S-CSCF 28 updates the current IMS server address into HSS 20 and also completes any third-party Registrations to TAS and other Application Servers (AS) in accordance with the local policy.

Figure 4:
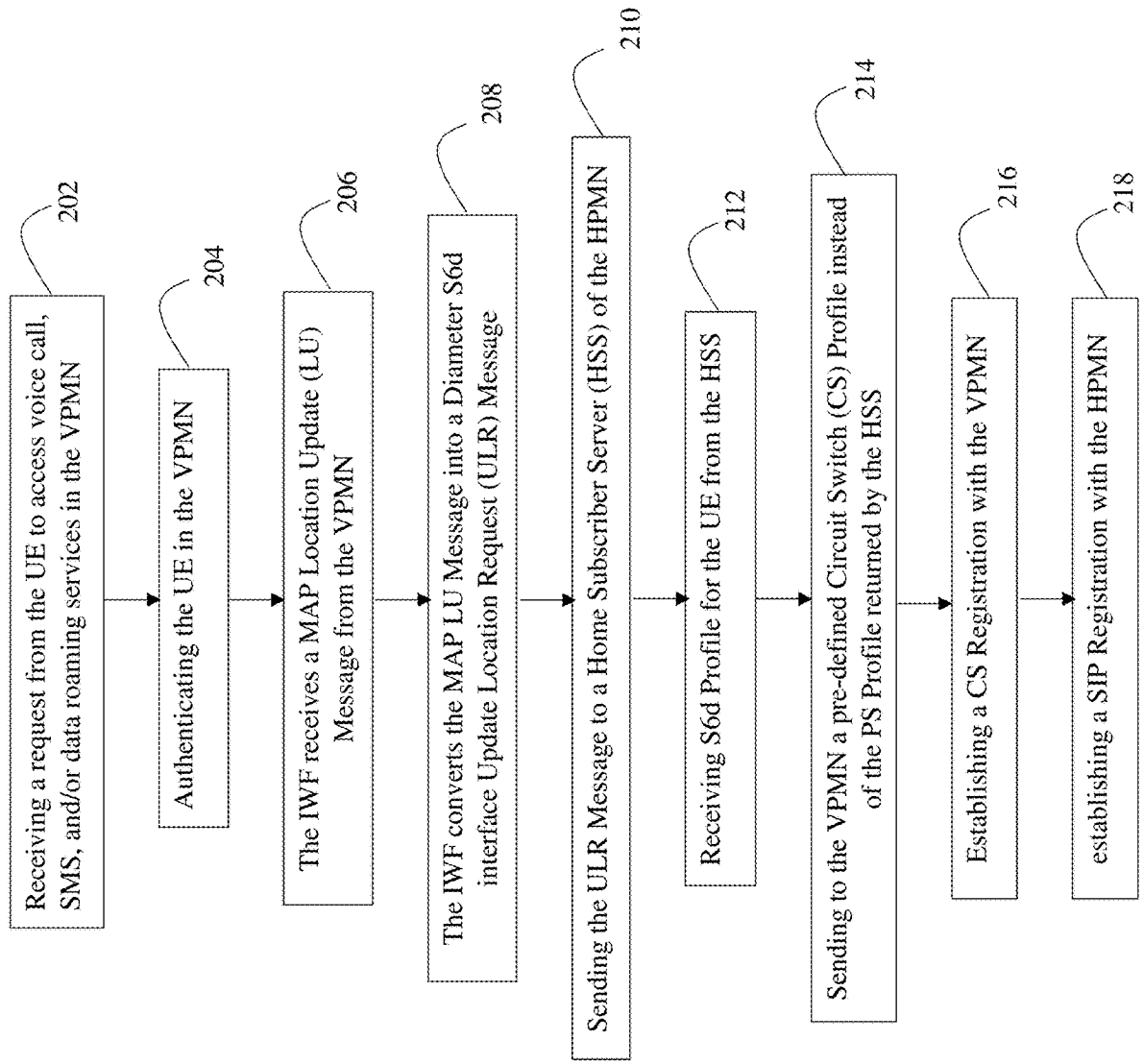
FIG. 4 is a flowchart illustrating the steps of establishing a CS Registration with VPMN and a SIP Registration with HPMN.

FIG. 4 is a flow chart illustrating the registration procedure. In step 202, VPMN 16 receives a request from UE 12 to access voice call, SMS, and/or data roaming services. In step 202, UE 12 is authenticated in VPMN 16, wherein IWF 40 converts between a MAP protocol of the VPMN 16 and a Diameter protocol of HPMN 14 during the authentication step. In step 204, the IWF receives a MAP LU Message from VPMN 16. In step 206, IWF 40 converts the MAP LU Message into a Diameter S6d interface ULR Message and, in step 208, sends the ULR Message to HSS 20 of HPMN 14. In step 210, HSS 20 returns a S6d Profile for the UE, the S6d profile being a Packet Switched (PS) Profile. In step 212, IWF 40 sends to VPMN 16 a pre-defined Circuit Switch (CS) Profile instead of the PS Profile returned by HSS 20. In step 214, responsive to VPMN 16 accepting the CS Profile, IWF 40 establishes a CS Registration with VPMN 16. IWF 40 also initiates SIP Registration in HPMN 14. In step 216, responsive to receiving a SIP Response from HPMN 14, IWF 40 establishes SIP Registration with HPMN 14. IWF 40 maintains the CS Registration with VPMN 16 and SIP Registration with HPMN 14, which enables provision of the voice call, SMS, and data roaming services to UE 12.

Data Registration

Figure 5:
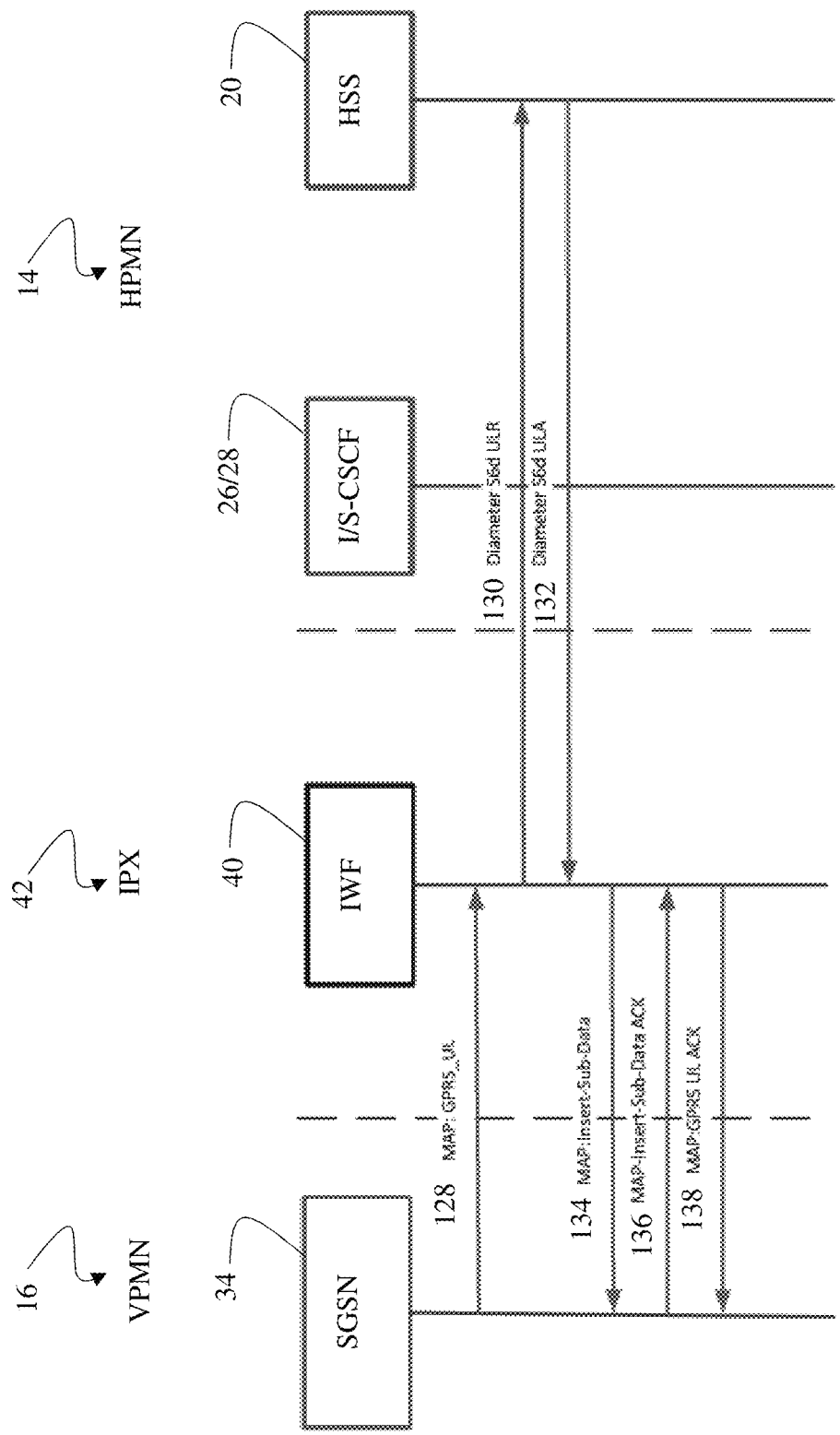
FIG. 5 is a signaling call flow of a procedure for data registration of the UE in the 2G/3G visited network and LTE home network.

FIG. 5 illustrates the process of registering for data services in accordance with the invention. In step 128, SGSN 34 sends MAP General Packet Radio Service (GPRS) LU message to IWF 40 to be routed to HPMN 14. IWF 40 converts the MAP:GPRS-LU message into a Diameter S6d interface ULR message and, in step 130, sends the converted message to HSS 20 of HPMN 14. In step 132, HSS 20 responds with a Diameter S6d ULA message. In step 134, IWF 40 returns a 2G/3G PS profile to SGSN 34 of VPMN 16 in a MAP:ISD transaction. Once the 2G/3G PS Profile has been accepted by SGSN 34, SGSN 34 sends a MAP:ISD Ack message to IWF 40 in step 136. Finally, IWF 40 responds to SGSN 34 with a MAP:GPRS UL Ack message in step 138, which completes registration for roaming data service for UE 12.

Call Delivery—IMS Origination

Figure 6:
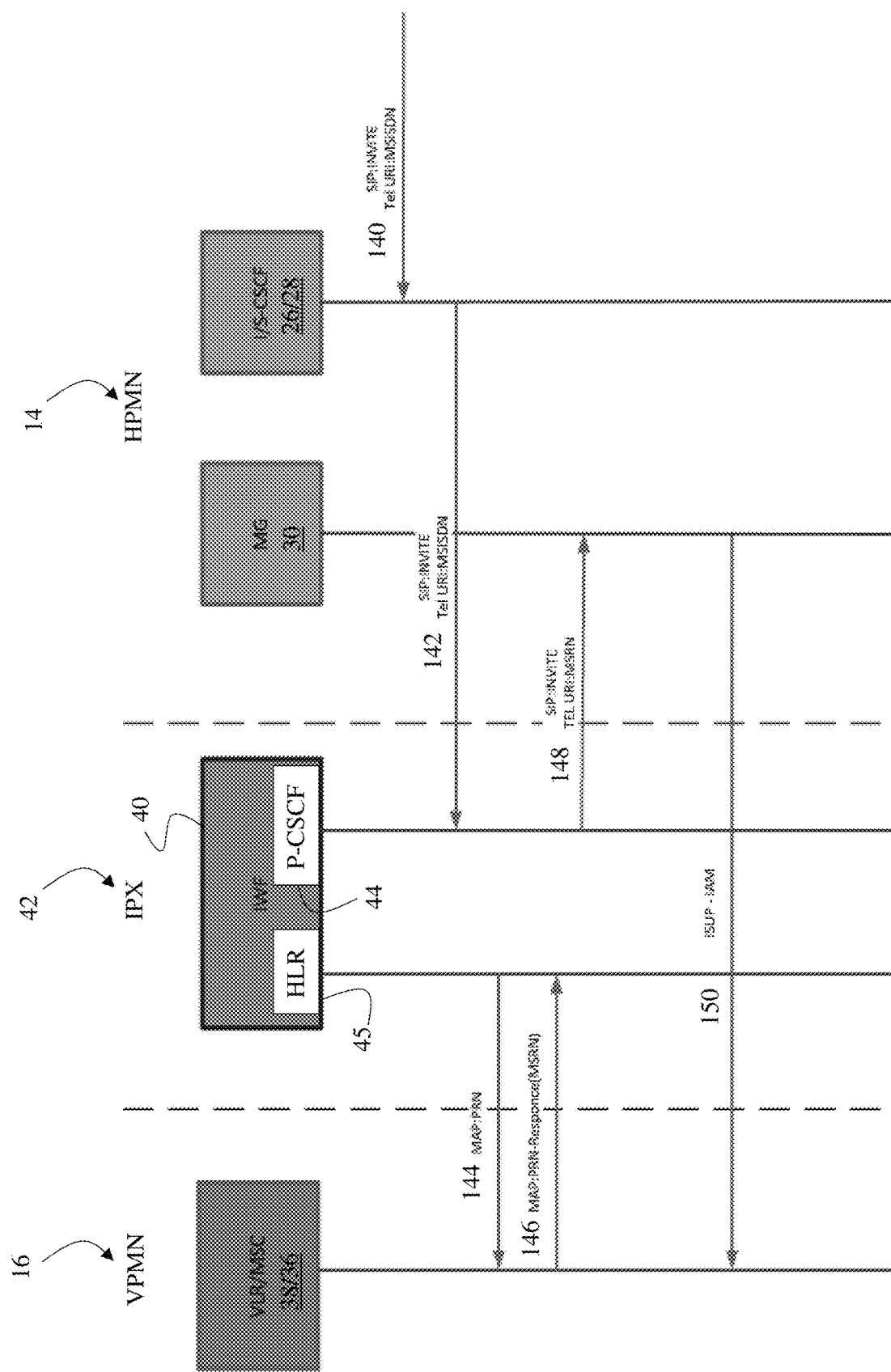
FIG. 6 is a signaling call flow of a procedure for delivery of a voice call originating from a Calling Party subscribed to an IMS network to the UE.

The procedure for call delivery for phone call originating from an IMS subscriber is depicted in FIG. 6. Any incoming calls for UE 12 will originate as SIP-Invite messages in which UE 12 Mobile Station International Subscriber Directory Number (MSISDN) is represented as a SIP Uniform Resource Identifier (URI). As shown in step 140, because UE 12 is IMS registered in HPMN 14, the SIP-Invite message is directed to S-CSCF 28 in HPMN 14, in which UE 12 is registered. In step 142, S-CSCF 28 forwards the SIP-Invite message for the incoming call to P-CSCF 44 component of IWF 40 via which UE 12 is registered. In step 144, HLR 45 of IWF 40 sends a MAP Provide-Roaming-Number (PRN) message to VLR 38 of VPMN 16 where UE 12 is attached. In step 146, VLR 38 returns a Mobile Subscriber Roaming Number (MSRN) assigned to UE 12 by VPMN 16. VLR 38 sends the MSRN in MAP:PRN-Response message to HLR 45 within IWF 40. HLR 45 returns the MSRN to P-CSCF 44 within IWF 40. In step 148, P-CSCF 44 sends a SIP-Invite message to MG 30 within HPMN 14 using the MSRN as a Request-URI in the SIP-Invite. MG 30 converts the SIP-Invite message to an Integrated Services Digital Network User Part (ISUP) Initial Address Message (IAM) and sends it to MSC 36 within VPMN 16 in step 150. Because the incoming call is from IMS subscriber and uses SIP signaling, MG 30 provides interworking between ISUP and SIP signaling to enable call control and interworking between Time Division Multiplexing (TDM) and Real-time Transport Protocol (RTP) for media.

Call Delivery—PSTN Origination

Figure 7:
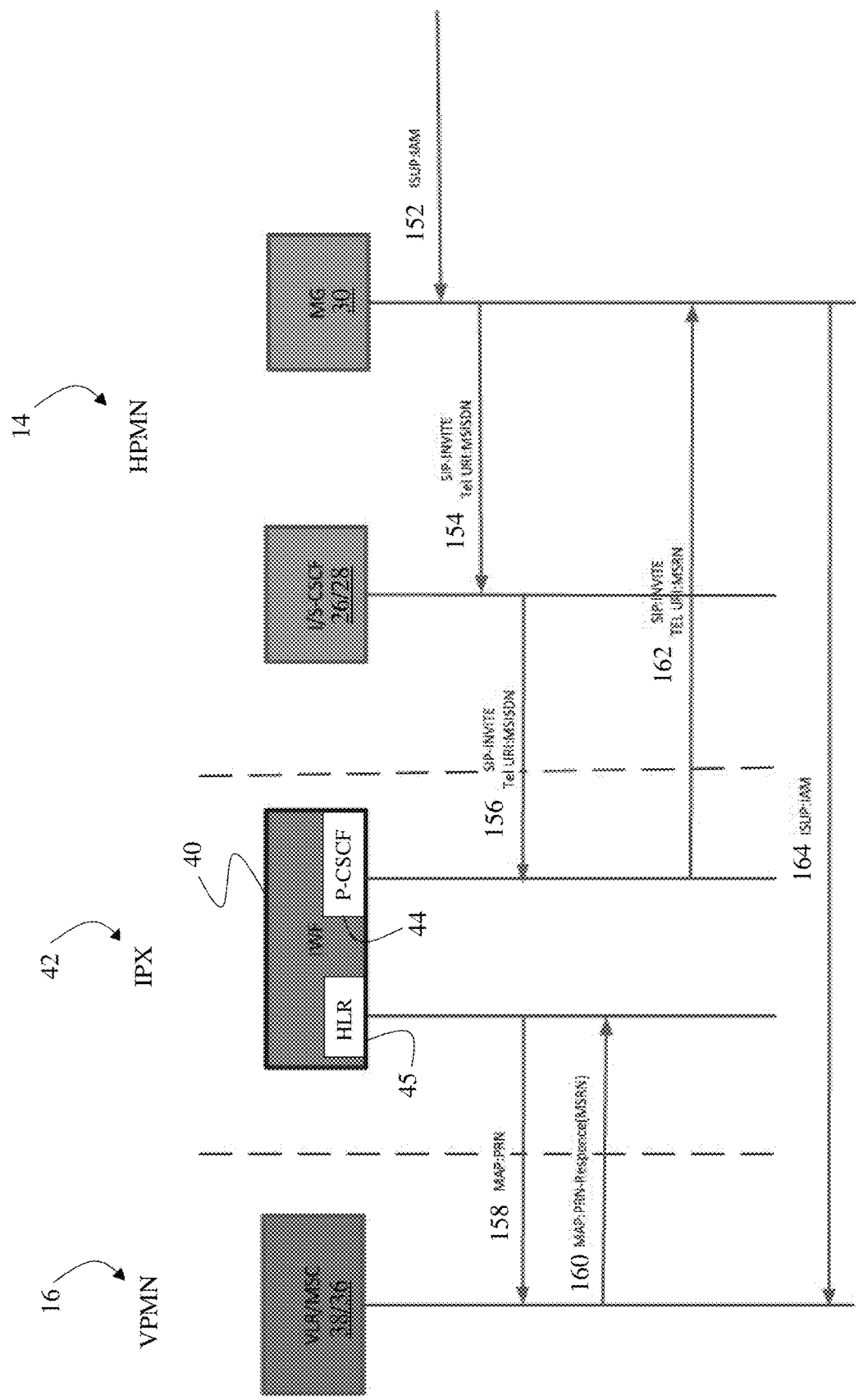
FIG. 7 is a signaling call flow of a procedure for delivery of a voice call originating from a Calling Party on a PSTN network to the UE.

FIG. 7 schematically illustrates the procedure for call delivery for calls incoming from a Public Switched Telephone Network (PSTN). Each such incoming call originates as ISUP:IAM, which is received by MG 30 of HPMN 14 in step 152. In step 154, because UE 12 is IMS-registered in HPMN 14, MG 30 directs the incoming call to S-CSCF 28 by sending SIP-Invite message to S-CSCF 28. In the SIP-Invite, MSISDN of UE 12 is represented as a SIP URI. In step 156, S-CSCF 28 forwards the SIP-Invite message for the incoming call to P-CSCF 44 of IWF 40. In step 158, HLR 45 of IWF 40 send a GSM PRN MAP message to VLR 38 of VPMN 16 where UE 12 is attached. VLR 38 returns MSRN of UE 12 to HLR 45 of IWF 40 in MAP PRN-Response. HLR 45 returns the MSRN to P-CSCF 44 of IWF 40. In step 162, P-CSCF 44 sends a SIP-Invite to MG 30 within HPMN 14 using the MSRN as the Request-URI in the SIP-Invite. MG 30 converts the SIP Invite into an ISUP IAM and sends it to MSC 36 of VPMN 16 in step 164. In the case of PSTN originating call, MG 30 does not need to provide SIP/RTP to ISUP/TDM inter-working because both call-legs are connected using ISUP/TDM.

Outgoing Call—IMS Termination

Figure 8:
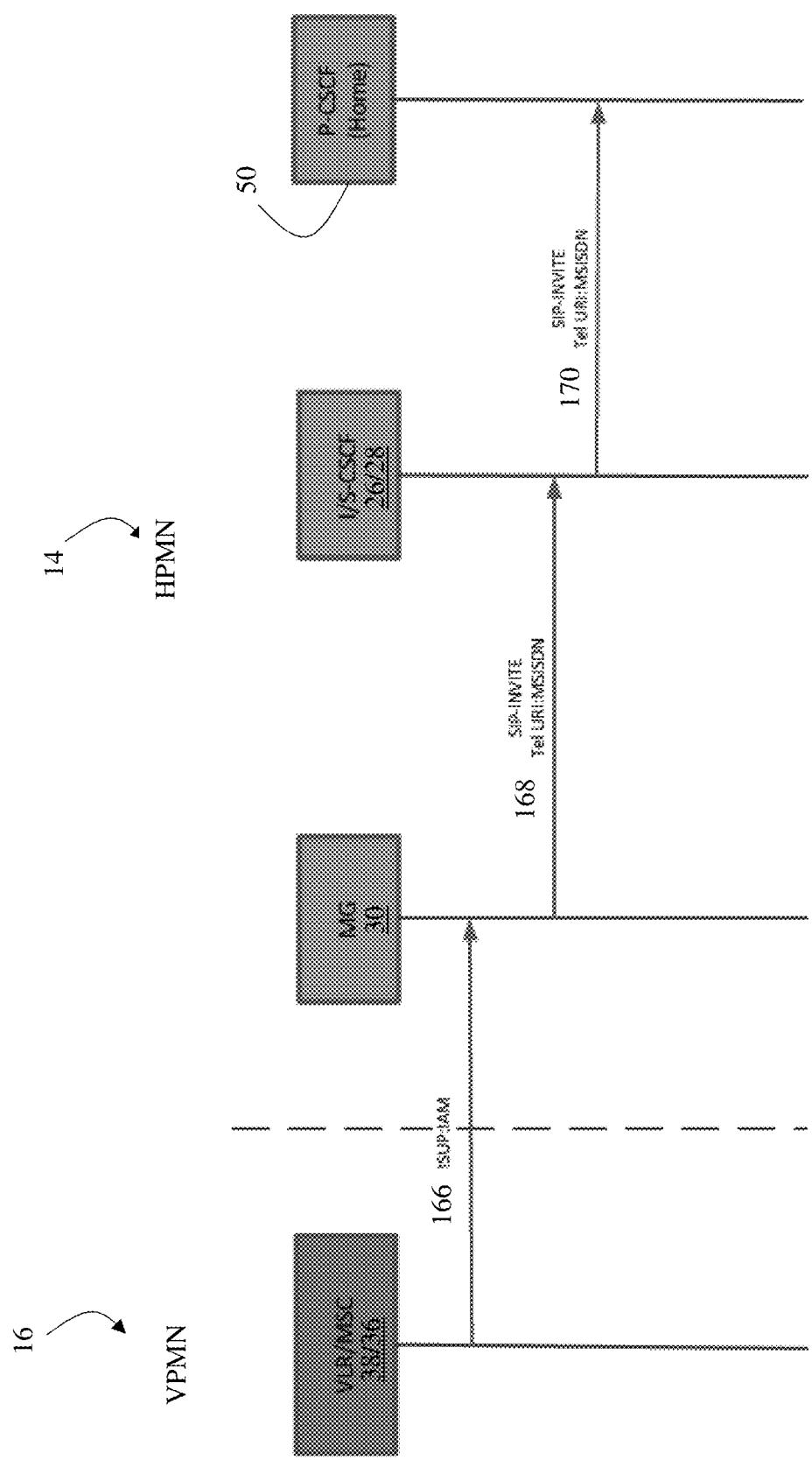
FIG. 8 is a signaling call flow of a procedure for origination of a voice call from the UE to a Called Party subscribed to an IMS network.

FIG. 8 schematically depicts the process for establishing an outgoing call from UE 12 to a device in an IMS domain. Each outgoing call made by UE 12 originates as ISUP:IAM, which is sent from MSC 30 of VPMN 16 in which UE 12 is attached to MG 30 of HPMN 14 as shown in step 166. In step 168, MG 30 forwards the call as a SIP-Invite to S-CSCF 28 of HPMN 14 in which UE 12 is registered. The SIP Invite represents MSISDN of the call recipient as SIP URI. In step 170, S-CSCF 28 routes the SIP Invite to P-CSCF 50 of the Called-Party. MG 30 provides interworking between ISUP and SIP for call control and between TDM and RTP for media in the IMS domain.

Outgoing Call—PSTN Termination

Figure 9:
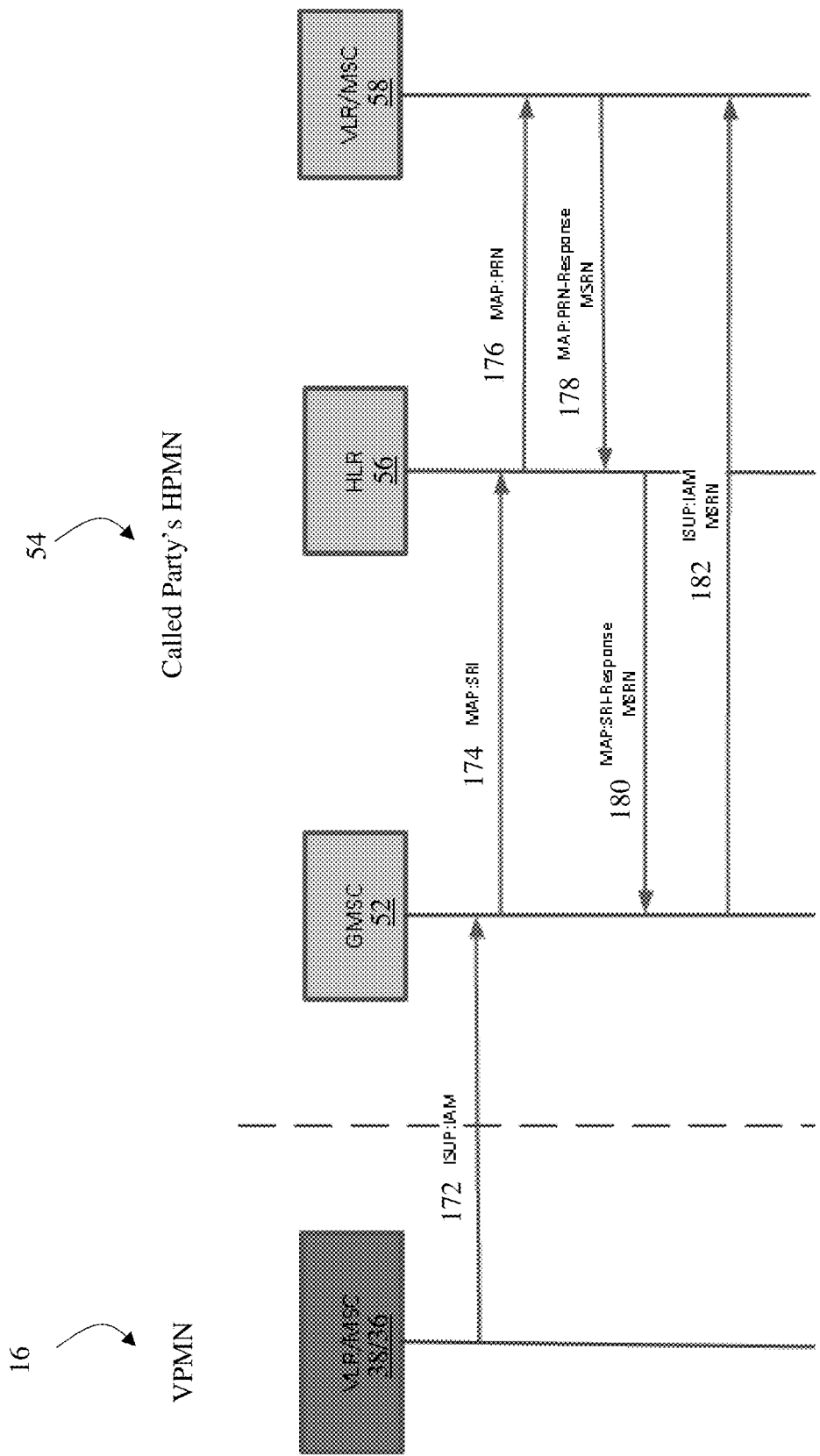
FIG. 9 is a signaling call flow of a procedure for origination of a voice call from the UE to a Called Party on a PSTN network.

FIG. 9 schematically depicts the process for establishing an outgoing call from UE 12 to a Called Party on a PSTN. This process is similar to regular GSM roaming. Each outgoing call made by UE 12 originates as ISUP:IAM, which, in step 172, is sent from MSC 30 of VPMN 16, in which UE 12 is attached, to GMSC 52 of Called-Party's HPMN 54. In step 174, GMSC 52 requests MSRN of the Called-Party from HLR 56 within HPMN 54 via a MAP Send Routing Information (SRI) message. In step 176, HLR 56 requests the MSRN from MSC 58 where the Called-Party is currently attached using a MAP:PRN message. In step 178, MSC 58 returns the requested MSRN via a MAP:PRN-Response message to HRL 54. In step 180, HLR 56 sends a MAP: SRI-Response message to GMSC 52. In step 182 GMSC 52 uses the MSRN to route the call the Called-Party by sending ISUP IAM message to MSC 58 of HPMN 54 in which the Called-Party is registered. HPMN 14 to which UE 12 is subscribed is not involved in originating calls made to the PSTN while the user is roaming in a VPMN 16.

SMS Mobile-Originating

Figure 10:
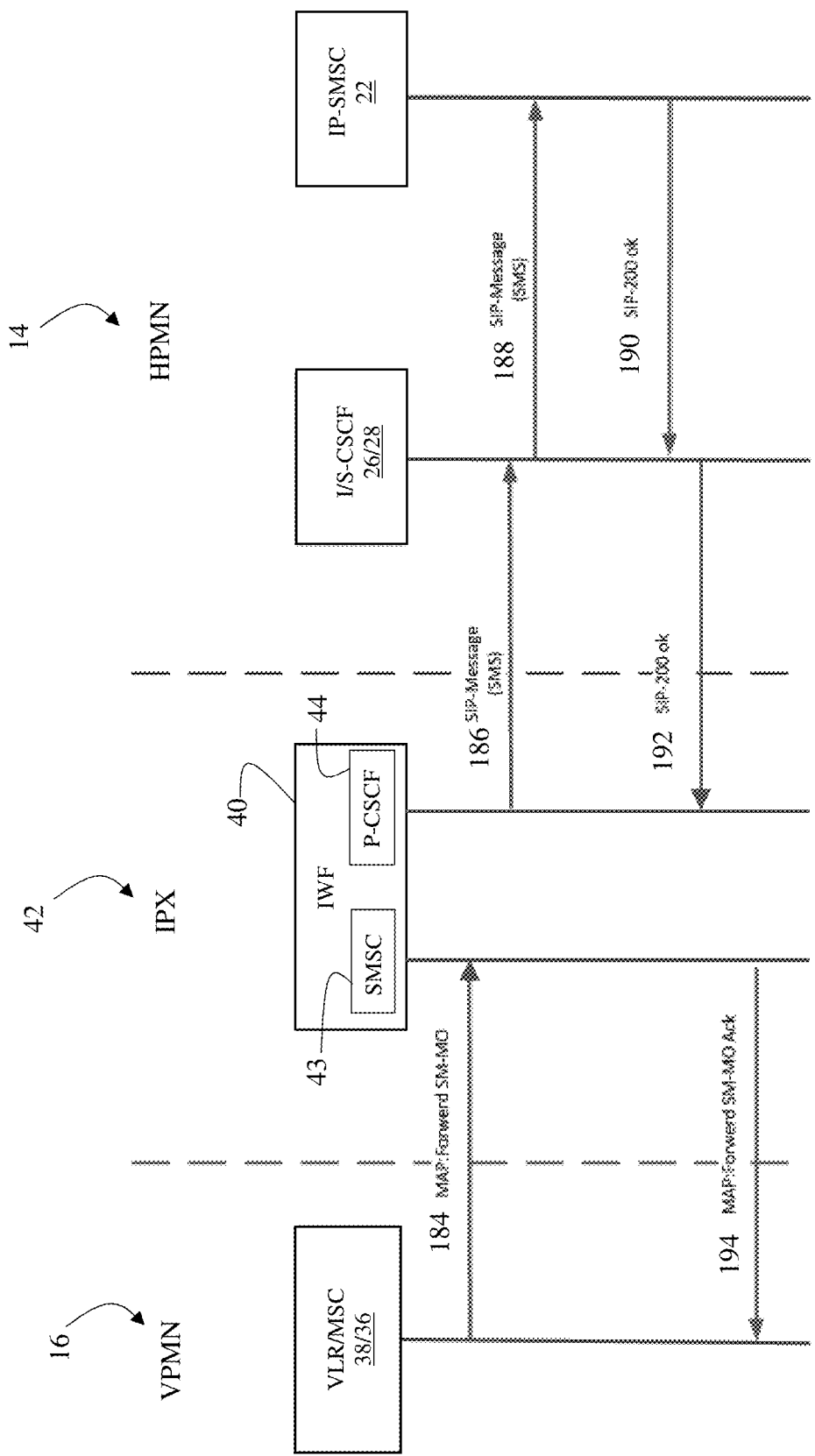
FIG. 10 is a signaling call flow of a procedure for sending an SMS message from the UE from to an intended recipient.

FIG. 10 illustrates the process for sending an SMS message originating from UE 12. The SMSC address provisioned in UE 12 is the address of SMSC 43 within IWF 40. Thus, when UE 12 sends an SMS message, MSC 36 of VPMN 16 uses Global Title (GT) routing to route the message to SMSC 43 of IWF 40 as MAP Forwarded SM-MO message in step 184. IWF 40 retrieves UE 12's MSISDN from the SMS payload. In step 186, P-CSCF 44 of IWF 40 sends a SIP SMS Message with the SMS MO TPDU towards S-CSCF 28 of HPMN 14 in which UE 12 is registered. In step 188, S-CSCF 28 forwards the SIP SMS Message to IP-SMSC 22 of HPMN 14. In step 190, IP-SMSC 22 responds to S-CSCF 28 with SIP 200 OK message. In step 192, S-CSCF 28 forwards SIP 200 OK message to IWF 40. In step 194, SMSC 43 of IWF 40 sends MAP Forwarded SM-MO Ack message to MSC 36 of VPMN 16.

SMS Mobile-Terminating

Figure 11:
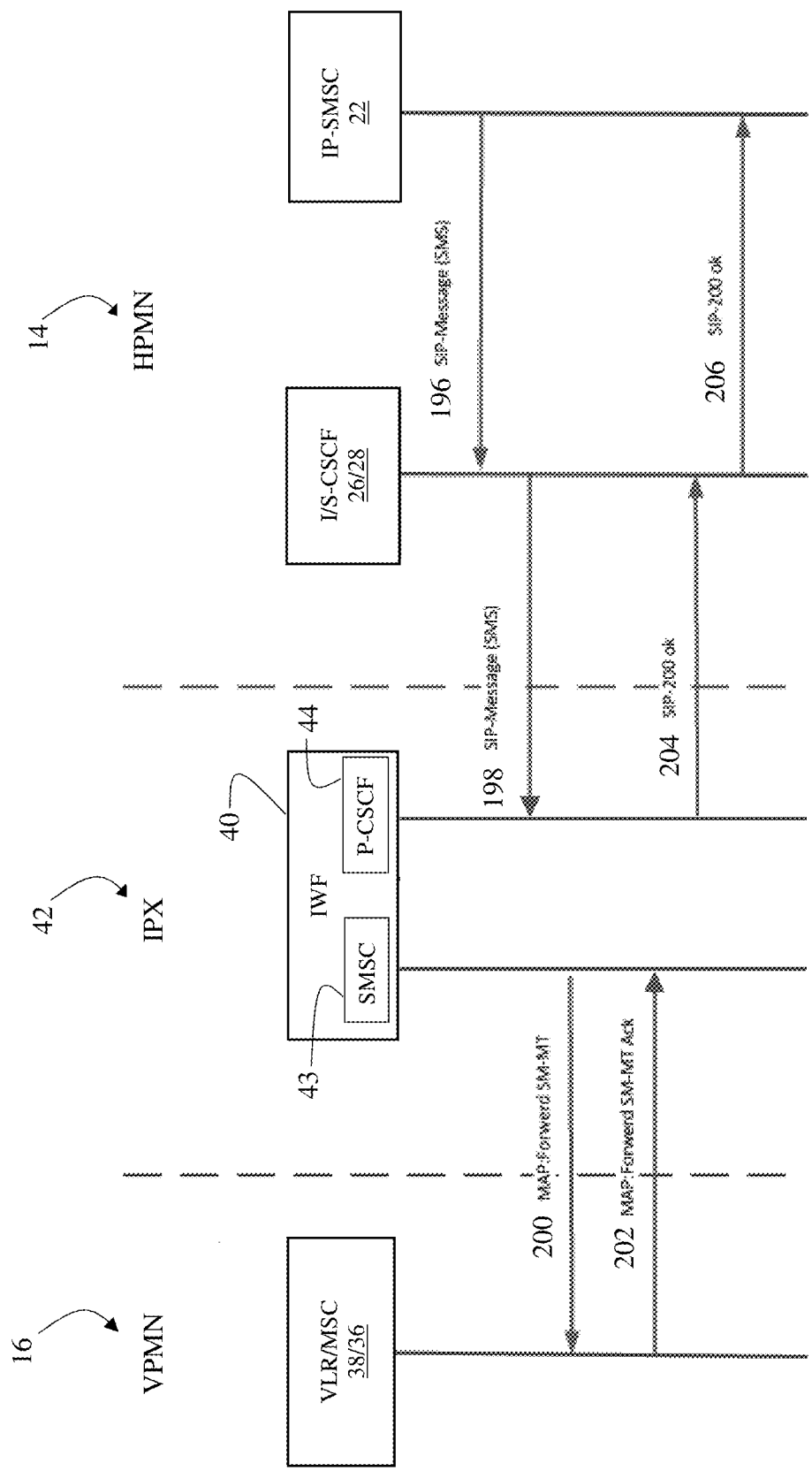
FIG. 11 is a signaling call flow of a procedure for sending an SMS message from a third party to the UE.

FIG. 11 illustrates how UE 12 receives SMS messages. When a Sending Party sends an SMS to UE 12, IP-SMSC 22 of HPMN 14 sends a SIP SMS Message with SMS MT TPDU to S-CSCF 28 in step 196. In step 198, S-CSCF 28 forwards this SIP SMS Message to P-CSCF 44 of IWF 40. IWF 40 retrieves the SMS MT TPDU from the SIP SMS Message and identifies terminating MSISDN. IWF 40 retrieves the address MSC 36 using SRI-SM to HLR. In step 200, SMSC 43 of IWF 40 GT routes a MAP Forwarded SM-MT message to MSC 36 of VPMN 16 in which UE 12 is attached. MSC 36 responds with a MAP Forwarded SM-MT message to SMSC 43 of IWF 40 in step 202. P-CSCF 44 of IWF 40 sends SIP 200 OK message to S-CSCF 28 in step 204. In step 206, S-CSCF 28 forwards the SIP 200 OK message to IP-SMSC 22.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

General Packet Radio Service (GPRS) is a packet oriented mobile data service on the 2G and 3G mobile communication system's global system for mobile communications (GSM).

Home Location Register (HLR) is the main database of permanent subscriber information for a mobile network and contains pertinent user information, including address, account status, and preferences.

Home Public Mobile Network (HPMN) is a network to which a roaming UE has a subscription.

Home Subscriber Server (HSS) is a server that can store and process subscription data and other information about each subscriber authorized to use the network.

IMS Core is the central network component of a communication system that is based on IP multimedia service protocols. The core network primarily provides interconnection and transfer between edge networks.

Interworking Function (IWF) a custom function configured to translate between MAP and Diameter protocols to enable interoperability of 2G/3G serve networks and LTE home networks.

International Mobile Subscriber Identity (IMSI) is a number assigned by a mobile system operator to uniquely identify a UE.

IP Multimedia Subsystem (IMS) is service based architecture that uses Internet protocol (IP) based systems to provide enhanced multimedia services. IMS evolved from the evolution of the 3rd generation mobile telephone standards that enabled users to access multimedia services using any type of access network that could use Internet protocols.

IP Packet eXchange (IPX) is a network used to exchange IP-based traffic. IPX interconnects multiple mobile networks through the use of common technical specifications based on IP.

Mobile Switching Center (MSC) is a 2G/3G network component that handles connections between mobile users within the network and is responsible for routing voice calls and SMS text messages.

Mobile Subscriber Roaming Number (MSRN) is a temporarily telephone number assigned to a UE which roams into the VPMN.

Mobile Station International Subscriber Directory Number (MSISDN) is a number used to identify a mobile phone number internationally.

Proxy Call Session Control Function (P-CSCF) is an entry point to the IMS domain and serves as the outbound proxy server for the UE. The UE attaches to the P-CSCF prior to performing IMS registrations and initiating SIP sessions.

Public Switched Telephone Network (PSTN) is the aggregate of the world's circuit-switched telephone networks that are operated by national, regional, or local telephony operators, providing infrastructure and services for public telecommunication.

Serving Call Session Control Function (S-CSCF) a SIP server located in the HPMN. S-CSCF uses the Diameter Cx interface to the HSS to download user profiles and upload user-to-S-CSCF associations.

Session Initiation Protocol (SIP)-Register message is a message sent from a UE used to register with a network.

Session Initiation Protocol (SIP)-Invite message is a message sent from a UE/calling party used to initiate a phone call with a called party.

Short Message Service Center (SMSC) is a network element in the mobile telephone network and is configured to store, forward, convert and deliver Short Message Service (SMS) messages.

User Equipment (UE) is a device that can connect to a communication system. Examples of UE devices include multimedia mobile telephones, personal computers, transceivers that are installed in vehicles or fixed wireless units.

Visitor Location Register (VLR) is a database in a mobile communications network associated to a Mobile Switching Center (MSC). The VLR contains the locations of mobile subscribers present in the service area of the MSC.

Visited Public Mobile Network (VPMN) is a mobile network used by a mobile subscriber while roaming.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of providing voice call, short message service (SMS), and data roaming services to a user equipment (UE) subscribed to a Greenfield LTE home public mobile network (HPMN) without circuit switch fallback capabilities and roaming in a 2G/3G visited public mobile network (VPMN), the method comprising:
    providing an Interworking Function (IWF) in communication with both the HPMN and the VPMN, the IWF having a Proxy Call Session Control Function (P-CSCF), a Home Location Register (HLR), and Short Message Service Center (SMSC) components;
    receiving a request from the UE to access voice call, SMS, or data roaming services in the VPMN, wherein the VPMN is a 2G/3G mobile network;
    converting between a Mobile Application Part (MAP) protocol of the VPMN and a Diameter protocol of the HPMN to authenticate the UE in the VPMN;
    receiving a Packet Switched (PS) Profile for the UE from the HPMN;
    sending a pre-defined Circuit Switch (CS) Profile to the VPMN instead of the PS Profile;
    responsive to the VPMN accepting the CS Profile, establishing a CS Registration between the IWF and the VPMN;
    establishing a Session Initiation Protocol (SIP) Registration between the IWF and the HPMN; and
    wherein the steps establishing both the CS Registration with the VPMN and the SIP Registration with the HPMN enable provision of the voice call, SMS, and data roaming services to the UE subscribed to the HPMN while the UE is roaming in the VPMN, wherein HPMN is the Greenfield LTE mobile network without circuit switch fallback capabilities and the VPMN is a 2G/3G mobile network.

2. The method of claim 1, wherein to authenticate the UE in the VPMN, the IWF converts a MAP Send Authentication Information (SAI) Message originating from the VPMN to a Diameter S6d interface Authentication Information Request (AIR) Message and transmits the AIR Message to a Home Subscriber Server (HSS) of the HPMN, and the IWF converts an Authentication Information Answer (AIA) Message received from the HSS to a MAP SAI Response Message and sends the MAP SAI Response Message to the VPMN.

3. The method of claim 1, wherein the IWF is hosted on the IP Packet eXchange (IPX) network.

4. The method of claim 1, wherein registration for data services in the VPMN comprises the steps of a Serving General Packet Radio Service (GPRS) Support Node (SGSN) sending a GPRS Location Update message to the IWF, and the IWF returning the PS profile to the SGSN.

5. The method of claim 1, wherein call delivery to the UE comprises the steps of a Serving Call Session Control Function (S-CSCF) of the HPMN forwarding a SIP Invite message to the P-CSCF component of the IWF; the HLR component of the IWF querying a Visited Location Register (VLR) of the VPMN for a Mobile Subscriber Roaming Number (MSRN) of the UE and returning the MSRN to the P-CSCF component of the IWF; the P-CSCF component of the IWF sending the SIP Invite message to Media Gateway (MG) of the HPMN.

6. The method of claim 5, wherein for IMS originating calls, the MG provides interworking between Integrated Services Digital Network User Part (ISUP) and SIP signaling for call control.

7. The method of claim 1, wherein call delivery for call originating from the UE to an IMS subscriber comprises the steps of a Mobile Switching Center (MSC) of the VPMN sending an ISUP message to a MG of the HPMN; the MG sending a SIP Invite to a S-CSCF of the HPMN; and the S-CSCF routing the SIP Invite to a P-CSCF within the IMS subscriber's home network.

8. The method of claim 1, wherein call delivery for call originating from the UE to a Called Party subscribed to a Public Switched Telephone Network (PSTN) comprises the steps of a MSC of the VPMN sending an ISUP message to a Gateway Mobile Switching Center (GMSC) of the Called Party's home network; the GMSC requesting a MSRN assigned to the Called Party from a HLR within the Called Party's network, and the GSMC using the MSRN to route the call to the Called Party.

9. The method of claim 1, wherein sending of an SMS message originating from the UE comprises the steps of a MSC of the VPMN routing the SMS message to the IWF; the IWF retrieving the UE's Mobile Station International Subscriber Directory Number (MSISDN) from the SMS message; the P-CSCF component of the IWF sending a SIP SMS Message to a S-CSCF of the HPMN; and the S-CSCF forwarding the SIP SMS Message to an IP-SMSC within the HPMN.

10. The method of claim 9, wherein an SMSC address provisioned in the UE is that of the IWF.

11. An Interworking Function (IWF) for providing voice, short message service (SMS), and data roaming services to a user equipment (UE) subscribed to a Greenfield LTE home public mobile network (HPMN) without circuit switch fallback capabilities and roaming in a 2G/3G visited public mobile network (VPMN), the IWF configured to execute the steps comprising:
  converting messages between a Mobile Application Part (MAP) protocol of the VPMN and a Diameter protocol of the HPMN to authenticate the UE in the VPMN, wherein the VPMN is a 2G/3G mobile network and the HPMN is an LTE mobile network;
  receiving a Packet Switched (PS) Profile for the UE from the HPMN;
  sending to the VPMN a pre-defined Circuit Switch (CS) Profile instead of the PS Profile returned by the HPMN;
  responsive to the VPMN accepting the CS Profile, establishing a CS Registration with the VPMN; and
  establishing a Session Initiation Protocol (SIP) Registration with the HPMN;
  wherein by establishing both the CS Registration with the VPMN and the SIP Registration with the HPMN, the IWF enables provision of the voice, SMS, and data roaming services to the UE subscribed to the HPMN while the UE is roaming in the VPMN, wherein HPMN is the Greenfield LTE mobile network without circuit switch fallback capabilities and the VPMN is a 2G/3G mobile network.

12. The IWF of claim 11, wherein to authenticate the UE in the VPMN, the IWF converts a MAP Send Authentication Information (SAI) Message originating from the VPMN to a Diameter S6d interface Authentication Information Request (AIR) Message and transmits the AIR Message to a Home Subscriber Server (HSS) of the HPMN, and the IWF converts an Authentication Information Answer (AIA) Message received from the HSS to a MAP SAI Response Message and sends the MAP SAI Response Message to the VPMN.

13. The IWF of claim 11, wherein the IWF is hosted on the IP Packet eXchange (IPX) network.

14. The IWF of claim 11, wherein registration for data services in the VPMN comprises the steps of a Serving General Packet Radio Service (GPRS) Support Node (SGSN) sending a GPRS Location Update message to the IWF, and the IWF returning the PS profile to the SGSN.

15. The IWF of claim 11, wherein call delivery to the UE comprises the steps of a Serving Call Session Control Function (S-CSCF) of the HPMN forwarding a SIP Invite message to a Proxy Call Session Control Function (P-CSCF) component of the IWF; a Home Location Register (HLR) component of the IWF querying a Visited Location Register (VLR) of the VPMN for a Mobile Subscriber Roaming Number (MSRN) of the UE and returning the MSRN to the P-CSCF component of the IWF; the P-CSCF component of the IWF sending the SIP Invite message to Media Gateway (MG) of the HPMN.

16. The IWF of claim 15, wherein for IMS originating calls, the MG provides interworking between Integrated Services Digital Network User Part (ISUP) and SIP signaling for call control.

17. The IWF of claim 11, wherein call delivery for call originating from the UE to an IMS subscriber comprises the steps of a Mobile Switching Center (MSC) of the VPMN sending an ISUP message to a MG of the HPMN; the MG sending a SIP Invite to a S-CSCF of the HPMN; and the S-CSCF routing the SIP Invite to a P-CSCF within the IMS subscriber's home network.

18. The IWF of claim 11, wherein call delivery for call originating from the UE to a Called Party subscribed to a Public Switched Telephone Network (PSTN) comprises the steps of a MSC of the VPMN sending an ISUP message to a Gateway Mobile Switching Center (GMSC) of the Called Party's home network; the GMSC requesting a MSRN assigned to the Called Party from a HLR within the Called Party's network, and the GSMC using the MSRN to route the call to the Called Party.

19. The IWF of claim 11, wherein sending of an SMS message originating from the UE comprises the steps of a MSC of the VPMN routing the SMS message to the IWF; the IWF retrieving the UE's Mobile Station International Subscriber Directory Number (MSISDN) from the SMS message; a P-CSCF component of the IWF sending a SIP SMS Message to a S-CSCF of the HPMN; and the S-CSCF forwarding the SIP SMS Message to an IP-SMSC within the HPMN.

20. The IWF of claim 19, wherein an SMSC address provisioned in the UE is that of the IWF.

* * * * *